March 2, 1937.  C. S. GILLE  2,072,517
FURNACE CIRCULATORY SYSTEM
Filed Aug. 2, 1935
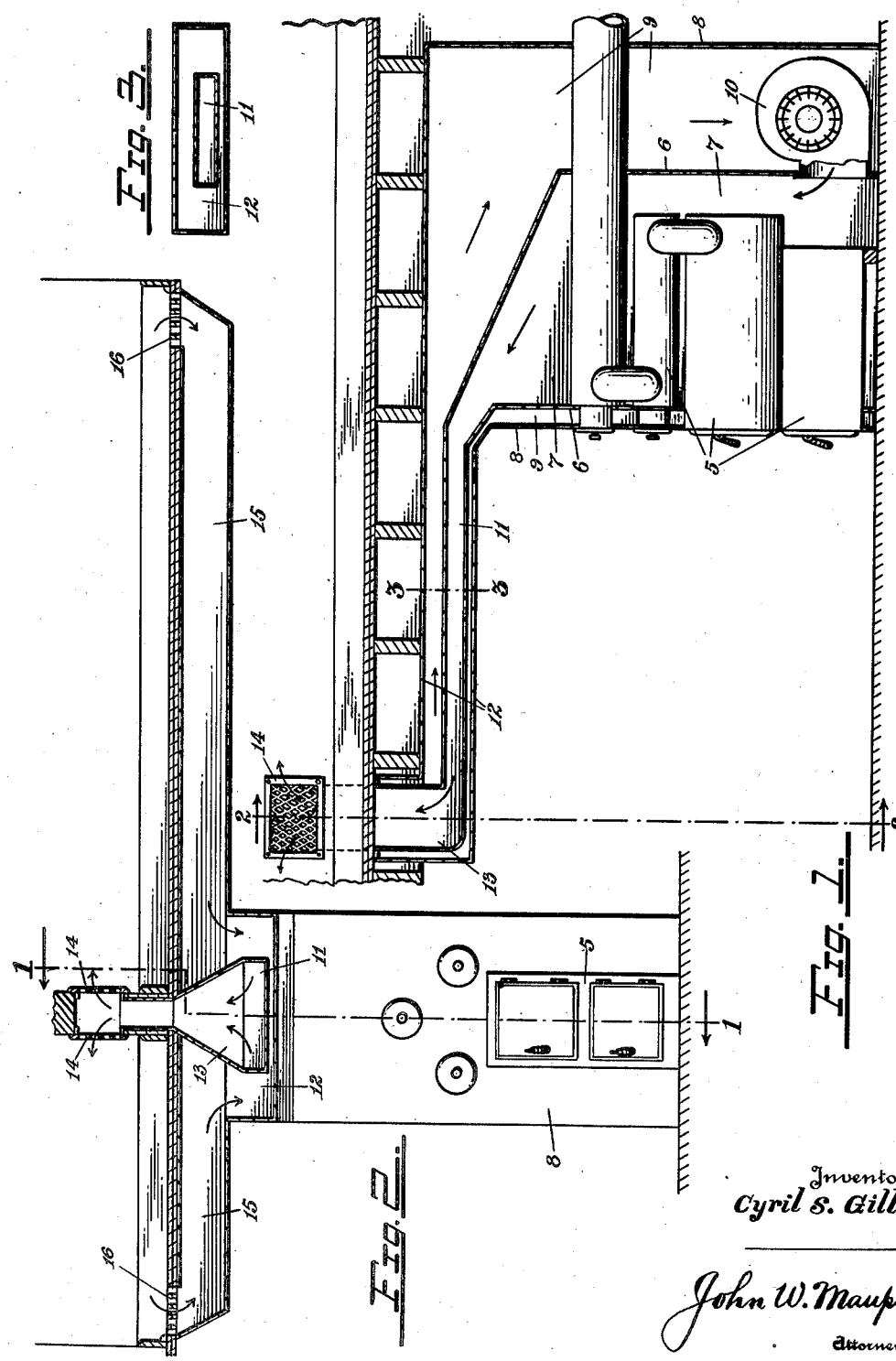
Inventor
Cyril S. Gille
John W. Maupin
Attorney Patented Mar. 2, 1937

2,072,517

UNITED STATES PATENT OFFICE 2,072,517

FURNACE CIRCULATORY SYSTEM

Cyril S. Gille, Woodinville, Wash.

Application August 2, 1935, Serial No. 34,351

2 Claims. (Cl. 237—53)

My invention relates to furnace circulatory systems and the primary object of the invention is to prevent the loss of heat units in the circulatory system. In the present day circulatory systems the cold air trunks, which conduct the cold air from the rooms down into the furnace, and the hot air trunks, which convey the hot air from the furnace up into the rooms, are entirely separate and apart from each other. Although the hot air trunks or conduits in the present day systems are usually covered with sheet asbestos, much heat is lost in the basement by direct radiation and conduction wherein the hot air conduits and casing warm the basement air and is therefore wasted; by convection as the warm air moves away from the hot air trunks and casing; and by out filtration caused by leakage of hot air from faulty connected pipes and casings.

My improvement consists essentially in enclosing the hot air trunk within the cold air trunk as more fully hereinafter set forth. By means of my system, the foregoing heat losses are prevented and fire hazards are eliminated. The heat which is ordinarily lost from the hot air trunk and casing is immediately picked up by the cold air trunk, preheated, and returned in circulation to the furnace without appreciable heat loss. By saving the heat which is ordinarily lost in the basement, a material saving is effected in fuel bills.

This improvement clearly differs from the system embodied in the furnace commercially known as the "pipeless furnace" which is a vertical gravity system having a cold air casing surrounding a hot air casing, both of which have their outlet in the room directly above the furnace. In my improved system, the hot air trunk is not only enclosed by the cold air trunk but both are extended to the different rooms of a building, thus forming a complete circulatory system; and the object of conserving heat within the system is entirely different. My improvement also obviously differs from the systems wherein the hot air trunk is enclosed by an outside pipe with a dead air space between for the purpose of insulation against heat loss.

In the drawing:

Figure 1 is a view in longitudinal vertical section of a furnace circulatory system embodying the principles of the invention, and taken substantially on a broken line 1—1 of Fig. 2;

Fig. 2 is a view in transverse vertical section taken on a broken line 2—2 of Fig. 1; and Fig. 3 is a detail view in transverse vertical section taken on a broken line 3—3 of Fig. 1.

Referring in detail to the drawing, the reference numeral 5 designates a furnace or other heating element which may be of any type or form and use any kind of fuel or heat generating medium. Immediately surrounding the furnace is a hot air casing 6 leaving a hot air chamber 7 between it and the furnace. Surrounding the hot air casing is a cold air casing 8 forming a cold air chamber 9 between it and the hot air casing 6. A fan 10, as shown in diagram in Fig. 1, is disposed in the bottom of the cold air chamber and has its discharge end extending through the wall of the hot air casing.

Connected to and extending from the top of the hot air casing 6 and chamber 7 is a hot air trunk or conduit 11. A cold air trunk 12 encloses said hot air trunk leaving a space therebetween, and extends from a connection with the top of the cold air casing 8. At 13 the hot air trunk is deflected upwardly through the top wall of the cold air trunk, and through a vertical wall of the building wherein the system is installed, where it has its outlet through registers 14. At substantially the same point the cold air trunk is extended at right angles to itself in both directions to form a branch trunk 15. At each end of said branch trunk a cold air intake 16 is provided in the floor of the building.

From the foregoing description it will be apparent that, when a fire is burning in the furnace 5 and the fan 10 is set in motion, the air will circulate as indicated by the direction arrows shown in the drawing. The hot air, in passing upward from the hot air chamber 7 and through the hot air trunk 11, will warm up the cold air passing downward through the surrounding cold air trunk 12 and the cold air chamber 9. There will be no loss of heat units as all heat radiating from the hot air trunk will be utilized in preheating the downwardly passing cold air. The fan is probably necessary for efficient circulation, although the system will doubtless operate without it if the trunk conduits are slanted to a proper degree.

It is, of course, understood that the drawing is intended only as an illustration of one means for reducing the principles of the invention to practice and that the invention is, by no means, limited to the structure herein shown. The invention contemplates any and all forms of air circulatory systems wherein a cold air trunk, or trunks, is extended from a surrounding cold air chamber under and along the basement ceiling of a building with intakes communicating with its different rooms; and a hot air trunk, or trunks, is passed upwardly from a hot air chamber surrounding a furnace and enclosed by the cold air chamber, and through the cold air trunk, or trunks, with branch conduits deflected upwardly through the top wall of the cold air trunk, or trunks, to outlets through registers in the rooms of the building.

I claim:—

1. In a furnace circulatory system, the combination with a furnace installed in the basement of a building having rooms and a floor between said rooms and basement, an inner casing surrounding the furnace and forming a hot air chamber therebetween, an outside casing surrounding the inner casing and forming a cold air chamber therewith, a cold air trunk extending from a connection with the cold air chamber upwardly and along the bottom of the floor, cold air intakes extending through the floor to a connection with the cold air trunk for conducting cold air from the rooms to the cold air chamber, a hot air trunk extending from a connection with the hot air chamber upwardly and inside of the cold air trunk leaving a space between the hot and cold air trunks for the downward passage of cold air, a branch conduit connected to the hot air trunk and deflected through the wall of the cold air trunk and the floor of the building to each room, and registers in each room connected to the ends of the branch conduits for escape of hot air into the rooms.

2. In a furnace circulatory system, the combination with a furnace installed in the basement of a building having rooms and a floor between said rooms and basement, an inner casing surrounding the furnace and forming a hot air chamber therebetween, an outer casing surrounding the inner casing and forming a cold air chamber therewith, a cold air trunk extending from a connection with the cold air chamber along the floor of the building, cold air intakes extending from the rooms through the floor to a connection with the cold air trunk, a hot air trunk extending from a connection with the hot air chamber and inside of the cold air trunk leaving a space therebetween, a branch conduit connected to the hot air trunk and deflected through the wall of the cold air trunk and the floor of the building to each room, registers connected to the ends of said branch conduits for the escape of hot air into the rooms, and a fan arranged to force air circulation from the cold air chamber into the hot air chamber.

CYRIL S. GILLE.